United States Patent Office 3,832,324
Patented Aug. 27, 1974

3,832,324
COMPOSITION FOR COATING SOLID SURFACES
Dean B. Parkinson, Redwood City, and Irvin A. Illing, Milpitas, Calif., assignors to McCall Corporation, New York, N.Y.
No Drawing. Continuation-in-part of application Ser. No. 810,100, Mar. 24, 1969, now Patent No. 3,554,392. This application July 6, 1972, Ser. No. 269,473
Int. Cl. C08g 45/08
U.S. Cl. 260—38
15 Claims

ABSTRACT OF THE DISCLOSURE

A rapidly curable composition which contains no volatile solvent or diluent except one which reacts with the system and does not volatilize which includes a polymerizable cycloaliphatic polyepoxide, a phenol-aldehyde resin hardening agent and a polyvalent metal salt of a phenolic material or a polysiloxanol as a catalyst is useful as a glass coating composition and as a printing ink.

---

This application is a continuation-in-part of Ser. No. 810,100 filed Mar. 24, 1969, now Pat. No. 3,554,392 and entitled "Composition for and Method of Coating Solid Surfaces."

This invention relates to curable epoxy compositions. More particularly, this invention relates to solventless, curable epoxy compositions characterized by rapid cure rates which are useful as novel inks and coating compositions.

Various methods and compositions have been employed heretofore to coat solid surfaces, such as metals, ceramics, plastics, wood and paper. For example, glass containers have been coated to conceal or protect the container contents from sunlight, for decorative purposes and to increase their lubricity, i.e. their resistance to abrasion when rubbed together during handling and processing.

In the coating of glass containers for such purposes as enhanced lubricity, decorative effects and to protect or conceal the content, it is desirable that the coating, besides being effective for the specific intended purpose, also be strongly adherent to the glass surface and that the coating be resistant to removal and/or deterioration when subjected to hot water, steam, steam autoclaving, alkalis, acids, organic solvents and detergents such as are commonly used in the sterilization of glass containers or to which the glass containers are likely to be subjected during use. Moreover, it is desirable that the coating be capable of functioning as an external coloring system for the container or other surface to which it is applied. Most importantly, it is essential that the coating be capable of being applied and cured rapidly so as not to interfere with assembly line production schedules.

Another aspect of glass manufacture which is relevant to the present invention is the coloring of glass. It is customary to color glass by incorporating a pigment in the raw mixture from which the glass is made. In some instances the pigment is added to molten mixture from which glass is made. It has been difficult, by such means, to obtain certain colors, e.g., ruby and yellow. Also, this technique lacks flexibility because, once a colored melt has been prepared it is difficult to change the color in response to fluctuation in production requirements. With an external coloring system, as by applying a colored coating to finished clear glass, greater flexibility and a greater range of colors are possible. However, heretofore, colors applied externally to finished glass have been inferior in appearance and quality.

Coating techniques which employ a volatile solvent or a volatile diluent that must be evaporated from the coating, such as an organic solvent or the water used in an emulsion are disadvantageous because evaporation of the solvent or diluent is troublesome and time consuming and because such evaporation impairs the quality of the coating. These systems require evaporation of the solvent or water. Where such coating operations are carried out in a production line, or where it is desired to carry out the coating operation in a production line, the evaporation of a solvent or of the water used in an emulsion is time consuming and interferes with production schedules. Also where the solvent is a flammable liquid fire hazards are created and it is impractical to employ such a solvent in close proximity to annealing equipment such as the lehr of a glass manufacturing plant or to an extrusion die in a metal fabricating plant such as an aluminum extrusion operation where the metal is extruded from a die in heated condition. It may also be undesirable to apply an aqueous emulsion to a heated product because of the rapid quenching effect of the water in the emulsion. It may be desirable to coat articles such as glass containers, glass fibers, flat glass, aluminum alloy extrusions, metal panels and ceramic products as they come from a heat treatment operation such as molding, annealing, firing or extrusion. If such a coating operation immediately follows a heat treatment operation, there is an advantage if complete coated articles are produced in one continuous operation. Heretofore, to our knowledge satisfactory solventless systems for coating glass containers have not been provided. By "solventless system" it is meant to include solvents in the strict sense and also non-reactive diluents such as water in emulsion systems.

The problems encountered in the coating of solid surfaces such as glass containers are in several significant respects comparable to the problems encountered in conventional printing processes such as letterpress, offset and rotogravure printing. In such processes, a web of paper is rapidly fed through a printing station where a fluid ink is applied to the paper and the paper is thereafter heated to drive off the volatile solvents forming the ink composition and set the ink. The use of volatile solvents in a printing process, as with the previously described coating techniques, creates a substantial pollution problem. However, for a solventless ink composition to be useful in existing printing equipment, it must be capable of being cured within the extremely short times and at temperatures which will not cause the paper to be burned or excessively dried, e.g. at or near the temperatures presently used to volatize the solvents found in conventional printing inks.

It is an object of the present invention to provide improvements in coating compositions.

It is a further object of the invention to provide a solventless system and technique for coating glass containers and other solid surfaces which can be applied economically and successfully to a production line.

Another object of the invention is to provide a solventless system, including a coating material, for coating articles in hot condition as they come from a heat treatment operation.

It is a particular object of the invention to provide a solventless system for coating glass containers which provides an adherent coating that substantially improves one or more properties of the containers such as lubricity, strength, etc.

Yet another object is to provide an improved method of coloring glass to closely simulate colors, and to improve upon certain colors, which have been imparted to glass heretofore by incorporating pigments in the molten glass before it is converted to the end product.

A still further object of the invention is to provide a curable, solventless composition which is useful as a printing ink.

The above and other objects of the invention will be apparent from the ensuing description and the appended claims.

By "solventless" as used herein, unless the context indicates otherwise, it is intended to refer to a system which is free of unreactive volatile solvent and of water.

It has now been discovered that excellent solventless coating agents and inks can be formed from a curable composition which has as its principal reactive agent a cycloaliphatic polyepoxide having the general formula:

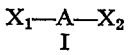

wherein $X_1$ and $X_2$ are similar or dissimilar epoxide bearing cycloaliphatic rings and A is a linking entity. The curable compositions also include a phenol-aldehyde resin hardening agent and a catalyst which is a metal salt of a phenolic material or a polysiloxanol. The compositions of the invention, as will be pointed out more fully hereinafter, may include either reactive or non-reactive diluents to control viscosity, pigments and other ingredients depending upon the specific end use of the composition. While curable epoxy compositions, including catalysts or accelerators, are generally known in the art it is believed that the specific combination of reactive ingredients and catalysts set forth hereinafter combine the essential properties of rapid cure time at reasonable temperature and solventless application which enables them to be used in coating and ink applications not heretofore considered possible by those skilled in the art.

Compositions of this type are excellently adapted to coat solid surfaces if the surface is heated to about 300° to 500° F. With faster curing systems lower surface temperatures suffice, e.g. 200° to 250° F. In any event curing of the composition may be accomplished in a period of less than one second to five minutes. If the system is applied to a production line wherein the articles are subjected to a heat treatment and are then allowed or caused to cool, the system is preferably applied during production and at a point where the articles have cooled to the desired range, e.g., 300° to 500° F. If it is preferable or necessary to apply the system to articles that have already cooled to room temperature, e.g., to glass, ceramic, metal, or other articles taken from a stockpile, the articles are heated. If the articles are bulky and have considerable thickness, it may be sufficient to heat only the surface to be coated although generally the entire article will be heated.

The composition may be applied by spraying, dipping, rolling or other known application techniques.

The composition may be applied to any type of solid surface which is compatible, i.e. which is not attacked by the system and which will withstand the temperature of curing for a short period of time. By way of example, the following may be coated: glass products such as glass containers, flat glass, optical glass, windshields, window panes and glass fibers; metal products such as steel, aluminum alloy and brass plates, sheets, strip, rods, wire and extruded shapes, etc.; wood products such as kiln dried and finished or semi-finished wood products such as panels, plywood and laminated beams; ceramic products such as earthenware, chinaware, insulators, etc.; plastic products such as sheets and molded shapes or the thermoset phenol-formaldehyde resins, melamine resins, etc.

It has also been discovered that the unique properties of the compositions of the invention make them suitable as solventless printing inks. In this application the premixed curable composition of the invention is applied to a printable surface, e.g. paper, in the conventional fashion using conventional letterpress, offset, rotogravure or other equipment. Due to the unique properties of the composition, curing of the ink occurs within the time and temperature ranges normally associated with conventional printing processes in which heat is applied to dry the ink and drive off the volatile solvents, e.g. 250° to 400° F., preferably 300° to 350° F., and 0.3 to 30.0 seconds, preferably 0.3 to 1.0 seconds.

Cycloaliphatic rings provided by $X_1$ and $X_2$ in Formula I above will usually be cyclohexane or cyclopentane rings but they may be 4, 7 or 8 membered rings or even a larger ring. 5 and 6 membered rings are preferred. The rings may have one or more hetero elements in the ring, e.g. O, S, or NH; and they may be substituted by hydrocarbyl groups (alkyl such as methyl, ethyl, propyl, butyl, octyl, decyl, etc.; aryl such as phenyl, tolyl, etc; aralkyl such as benzyl, and cycloaliphatic such as cyclohexyl and cyclopentyl); or by hetero groups such as methoxy, ethoxy, phenoxy, phenylmethoxy, Cl, Br, $NH_2$, substituted amino, OH, SH, etc. This ring may also be unsaturated. Also, condensed rings such as decahydronaphthalene may be used.

In Formula I, A may signify one or more covalent links between $X_1$ and $X_2$. This is illustrated in Table A below. Alternatively A may be a linking group ranging in complexity from a simple mono-, di- or tri-atomic group such as —O—, —S—, —NH— or —$CH_2$— to more complex, e.g., long chain groups, as shown in Table B below.

TABLE A.—COVALENT LINKING OF X TO THE EPOXIZED CYCLOALIPHATIC RING

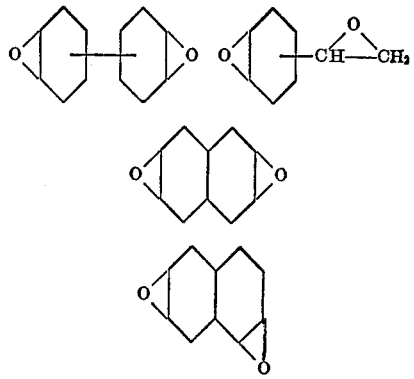

[In Table A and through this specification, the location of the epoxy oxygen outside a ring is intended to signify both the endo, e.g.

and the exo, e.g.

configurations, both of which are operative. When one such stereoisomer is liquid and the other stereoisomer is solid at room temperature, the former (liquid) form is preferred, but in all cases where the cycloaliphatic polyepoxide is solid, and especially where it is rather high melting, its melting point and viscosity can be lowered by applying heat and/or employing a reactive diluent which functions to lower viscosity and melting point but which, in the course of curing on a hot surface, reacts with the cycloaliphatic polyepoxide and therefore does not require evaporation.]

TABLE B.—A AS A LINKING GROUP

| | |
|---|---|
| —O—<br>—S—<br>—NH—<br>—C—<br>  ||<br>  O<br><br>—C—O—<br> ||<br> O<br><br>—O—C—<br>   ||<br>   O<br><br>—CH₂—<br>—CHR₁—<br>—CR₁R₂—<br>—(CH₂)ₘ— (m=1-20)<br>—(CH₂)ₙ—C—O— (n=1-20)<br>         ||<br>         O<br><br>—O—C—(CH₂)ₙ— (n=1-20)<br>    ||<br>    O<br><br>—C—(CH₂)ₙ—C— (n=1-20)<br>||         ||<br>O          O | (structures) |

In Table B, $R_1$ and $R_2$ are essentially hydrocarbyl groups, e.g. methyl, ethyl, propyl, etc.; phenyl, etc.; benzyl, etc., $R_3$ and $R_4$ are H, alkyl (e.g. methyl, ethyl, propyl, etc.) aryl, (phenyl, etc.), aralkyl (benzyl, etc.), etc.

In Formula I the $X_1$ and $X_2$ may be identical (i.e. 1 may be a *bis* compound) or they may be dissimilar. Formula IA represents a *bis* compound; Formula IB represents a class of compounds wherein $X_1$ and $X_2$ are similar but are not identical; and Formula IC represents a class of compounds in which these two epoxide-bearing groups are quite dissimilar.

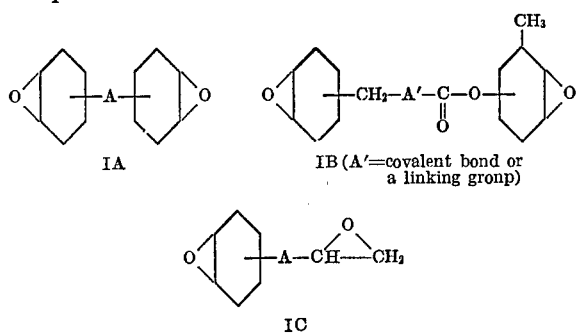

Moreover, A may bear one or more further epoxide-bearing groups such that Formula I takes a form such as

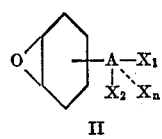

II wherein $X_1$, $X_2$ . . . $X_n$ are epoxide-bearing groups, $n$ being zero or a positive integer which indicates the total number of such epoxide-bearing groups. Illustrative of such higher polyepoxides is the following *tris*-compound:

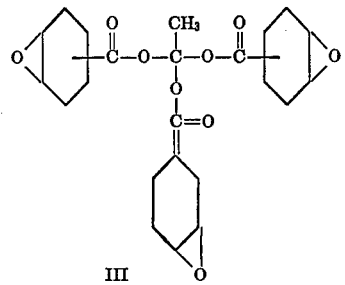

III

It will be understood throughout that rings such as

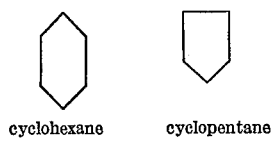

cyclohexane    cyclopentane are fully saturated rings (saturated cycloaliphatic rings); that unsaturation is indicated by a double bond, e.g.

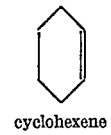

cyclohexene and that an aromatic ring is illustrated by the Kekule formula e.g.

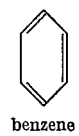

benzene

It will be understood that mixtures of any of these cycloaliphatic polyepoxides may be used as well as mixtures of these and of other cycloaliphatic polyepoxides with non-cycloaliphatic epoxides such as epichlorhydrin, ethylene oxide, propylene oxide and diglycidyl ether or bis-phenol A. In any case where a monomeric epoxide is mentioned, its lower homo- and interpolymers may be substituted for the monomer.

Specific examples of suitable cycloaliphatic polyepoxides are:

3,4-epoxycyclohexylmethyl-3,4-epoxycyclohexane-carboxylate;
3,4-epoxy-1-methylcyclohexylmethyl-3,4-epoxy-1-methyl-cyclohexane-carboxylate;
3,4-epoxy-3-methylcyclohexylmethyl-3,4-epoxy-2-methyl-cyclohexanecarboxylate;
3-methyl-1,5-pentanediol bis (3,4-epoxycyclohexane-carboxylate);
1,5-pentanediol bis (3,4-epoxycyclohexanecarboxylate);
2-methoxymethyl-2,4-dimethyl-1,5-pentanediol bis (3,4-epoxycyclohexanecarboxylate);
ethyleneglycol bis (3,4-epoxycyclohexanecarboxylate);
2,2-diethyl-1,3-propanediol bis (3,4-epoxycyclohexane-carboxylate);
2-butene-1,4-diol bis (3,4-epoxycyclohexanecarboxylate);
2-butene-1,4-diol bis (3,4-epoxy-6-methylcyclohexanecarboxylate);
1,1,1-trimethylolpropane tris(3,4-epoxycyclohexanecarboxylate);
1,2,3-propanetriol tris (3,4-epoxycyclohexanecarboxylate);
dipropyleneglycol bis(2-ethylhexyl-4,5-epoxycyclohexane-1,2-dicarboxylate);
diethyleneglycol bis(3,4-epoxy-6-methyl-cyclohexane-carboxylate); and triethylene glycol bis(3,4-epoxycyclohexanecarboxylate);
bis(3,4-epoxybimethylcyclohexylmethyl)adipate;
bis(3,4-epoxycyclohexylmethyl)oxalate;
bis(3,4-epoxy-6-methylcyclohexylmethyl)sebacate;
3,9-bis(3,4-epoxycyclohexyl)spirobi(meta-dioxane);
vinyl cyclohexene dioxide;
bis(2,3-epoxycyclopentyl)ether;
bis(epoxycyclopentyl)isophthalate;
1,3,5-tris(epoxycyclopentyl)benzene;
1-methoxy-3,5-bis(epoxycyclopentyl)benzene;
1,3-bis(epoxycyclopentyl)benzene;
bis(epoxycyclopentyl)methane;
bis(epoxycyclopentyl)sulfide;
bis(epoxycyclopentyl)ketone;
bis(3,4-epoxycyclopentyl)sebacate;
1,1,1-trimethylolpropane tris(3,4-epoxycyclopentyl carboxylate).

It will be understood that in the general and specific exemplifications above and below wherever a six membered cycloaliphatic ring (such as the cyclohexyl ring) is shown, a 4, 5, 7, 8 or higher membered ring may be used instead, and that the ring may have one or more unsaturated groups; that hereto rings may be used instead of carbocyclic rings wherever a cycloaliphatic or aromatic carbocyclic ring is shown, e.g. furan, pyrrole, pyridine and their fully or partially hydrogenated derivatives; and that wherever a replaceable hydrogen is shown, it may be replaced by a hydrocarbyl (e.g., methyl, ethyl, propyl, decyl, phenyl, tolyl, benzyl, cyclohexyl, etc.) or a hetero (e.g. methoxy, ethoxy, amino, dimethyl, amino, etc.) groups.

The hardening agents suitable for the preferred compositions are polyhydric phenols such as low molecular weight phenolic resins of the novolac or resole types. Particularly useful are modified phenol-aldehyde resins such as the 2,6-dimethyol-4-hydrocarbylphenols and their condensation products; e.g.

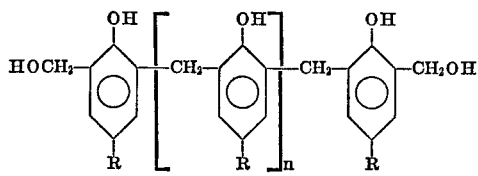

where R is an alkyl or hydrocarbyl group and $n$ may vary from 0 to 5 or 6. These are known commercially as Superbeckacite 1001 from Reichhold Chemicals, Inc. and Ambersol ST 137 from Rohm and Haas Chemical Company.

The cycloalpihatic polyepoxides of the classes described and illustrated may be catalyzed by any of a variety of catalysts, including polyvalent metal salts of phenols and polyvalent metal salts of polysiloxanols. Examples of these classes of catalysts are set forth below:

Polyvalent metal salts of phenolic novolac resins having the general formula

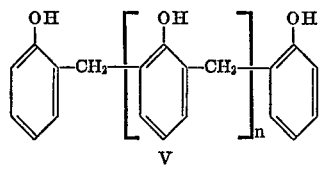

wherein $n$ is a small integer, e.g. 1, 2 or 3. This resin is referred to hereinafter as "Resin V." The metals forming salts of Resin V and other similar resins may be, for example, Al, Fe III and Ti IV. Homologues may be employed in which the benzene rings are substituted by one or more $C_1$ to $C_5$ alkyl groups.

Salts of the same metals with polyhydric phenols such as 2,4,4'-trihydroxybenzophenone; 2-nitroso-1-naphthol; 1,2,4-trihydroxyanthraquinone, etc.

Salts of the same metals with polysiloxanols which are hydrolytic products of $R_nSiX_{4-n}$ where R is aryl (e.g. phenyl) or alkyl (e.g. methyl), X is halogen (Cl, Br, F) and $n$ is 1 to 1.7; such polysiloxanols being soluble in xylene and having .45 to 20% by weight of hydroxyl radicals.

In those cases where the cycloaliphatic polyepoxide is slow curing, or where for any reason faster cure is desired, approprate catalysts may be employed such as tertiary amines, e.g. benzyldimethylamine and dimethylethanolamine. Generally, however it is preferred to use a fast curing aliphatic polyepoxide with a catalyst of the types described above.

The curable ink and coating compositions of the invention can be mixed with a large number of organic and inorganic dyes and pigments, for example, carbon black, titanium dioxide, zinc oxide, azo dyes, aniline black, phthalocyanine blue, phthalocyanine green, anthraquinone red, anthraquinone yellow, nigrosines, barium lithol reds, pigment green B, pigment green 10, and benzidine yellow; with mineral fillers (for example, calcium carbonate, silica, clays, mica, metal powders); with conventional rub compounds used in ink compositions such as low molecular weight waxes; and with ultraviolet absorbers or screening agents (e.g. 2(2' - hydroxy-3'-ditert.-butyl-5'-methylphenyl)benzotriazole; 2(2' - hydroxy - 5' - ditert. - butyl phenyl)benzotriazole; 2(2' - hydroxy - 5-methylphenyl) benzotriazole; p-octylphenylsalicylate; 2 - ethyl - hexyl-2-cyano-3,3-diphenyl acrylate; ethyl - 2 - cyano-3,3-diphenyl acrylate; 2,4-dihydroxybenzophenone; 2,2'-dihydroxy-4,4'-dimethoxy benzophenone; 2,2'-, 4,4'-tetrahydroxy benzophenone; 2'-hydroxy - 4 - methoxy benzophenone; 2,2'-dihydroxy - 4,4' - dimethoxy-5-sulfonbenzophenone; resorcinol monobenzoate; nickel bisoctyl phenylsulfide; [2,2'-thiobis(4' - tert - octyl phenolate)]-n-butylamine nickel). The selection and use of such additives will, of course, depend upon the particular end use of the curable composition.

The viscosity of the curable compositions of the invention may be controlled and will, of course, depend upon the particular end use of the composition. For example, for inks, the viscosity must be low enough to have good flow and provide uniform coverage without buildup but he high enough to avoid penetration of the paper or other printed surface. The viscosity of the compositions can be controlled within ranges normally associated with inks, for example, 15,000 to 50,000 centipoises. For other applications for example, where the curable composition will be sprayed, the viscosity may be lower. To some extent the viscosity of the curable composition will be controlled by the amount of hardener, pigment or other additives which are present. However, the present invention also contemplates the incorporation of reactive diluents, i.e. diluents which crosslink with the curable composition, or non-reactive diluents in the curable composition and which do not volatilize but rather become part of the final cured composition. Typical reactive diluents include glycidyl ethers such as decylglycidyl ether; 1,4-butanediol diglycidyl ether, and epoxidized soybean oil. Representative non-reactive diluents include dioctyl phthalate, polyethylene glycol 200 dibenzoate, alkyl aryl phosphate and non-volatile esters or ethers.

The amount of the cycloaliphatic epoxy monomer, phenol aldehyde resin hardener and catalyst or other ingredients which may be employed to form the novel compositions of the invention may vary widely depending upon the particular end use. Ordinarily, the monomer will comprise 40 to 95 wt. percent, preferably 60 to 90 wt. percent, of the curable composition. The amount of hardener may range from 5 to 30 wt. percent, preferably 5 to 25 wt. percent. The amount of catalyst may range from 0.01 to about 20 wt. percent, preferably 0.1 to 10 wt. percent. For ink compositions, where control of viscosity is of greater significance with respect to ultimate product performance, the amounts and types of ingredients may be as follows:

| Ingredient type | Broad range, percent | Preferred range, percent |
|---|---|---|
| Monomer (cycloaliphatic polyepoxide) | 40–80 | 40–65 |
| Resin hardening agent | 5–30 | 15–25 |
| Diluent | 5–20 | 5–15 |
| Pigment | 5–25 | a 10–15 / b 5–10 |
| Rub compounds | 1–10 | 1–3 |
| Catalyst | 2–15 | 5–10 | a For black.  b For other colors.

The invention will be further understood by reference to the following illustrative examples:

Example 1

An uncatalyzed composition was prepared from the following:

| Ingredient type | Chemical name | Amount, percent |
|---|---|---|
| Epoxy monomer | 3,4-epoxycyclohexylmethyl-3,4-epoxycylohexane carboxylate. | 54.8 |
| Reactive diluent | Decylglycidyl ether | 7.8 |
| Hardening agent | Condensation polymer of 2,6-dimethyl-4-butylphenol. | 12.5 |
| Pigment | Alkali blue | 3.1 |
| Rub compound | Low molecular weight wax sold under the trade name "UFO Poly Compound B–4501" by Stress Rueter Chemical Co. | 2.0 |
| Pigment | Carbon black | 19.5 |

All the components except carbon black and alkali blue were combined and brought into solution using heat. The mixture was then allowed to cool to room temperature and the carbon black and alkali blue were thoroughly dispersed in the mixture using a three-roll ink mill. This masterbatch was then used for subsequent formulation with catalysts to give finished compositions for both coating and ink applications.

Example 2

Ten parts of uranyl nitrate was dissolved in ten parts methanol to which was added ninety parts dioctylphthalate and one hundred parts of a phenolic resin of the novolac type (Formula V) sold under the designation BRZ–7541 by Union Carbide. The mixture was heated at 120° C. for one hour and then allowed to cool before use. A mixture of five and one-half parts of this catalyst with one hundred parts of the masterbatch described in Example 1 was run on an offset press and was found to cure in a dwell time of about 0.3 seconds at a web temperature of 300° F. giving good print quality. The pot life of the catalyzed composition showed no increase in viscosity over a period of many hours.

Example 3

Five parts of tetrabutyl titanate was reacted with fifty parts of BRZ–7541 at room temperature with stirring. The mixture produced an exotherm yielding a viscous brown liquid. A mixture of six parts of this catalyst with one hundred parts of the masterbatch described in Example 1 gave a cure time of one minute at 150° C. for a one-half mil film coated on tin-plate. The pot life of the catalyzed composition exceeded four days with no appreciable viscosity increase.

Example 4

Fourteen and seven-tenths parts ferric chloride was reacted with thirty-five parts BRZ–7541 at 150° C. until HCl evolution ceased (about one hour). A viscous brown liquid resulted which was then diluted with twenty-five parts of dioctylphthalate. A mixture of six parts of this catalyst with one hundred parts of the masterbatch described in Example 1 gave a cure time of one minute at 150 C. for a one-half mil film coated on tin-plate. The viscosity of the catalyzed composition remained constant over several hours time. Five parts of this catalyst was incorporated with fifty parts of the epoxy monomer described in Example 1 and eleven parts of BRZ–7541. This composition was sprayed on glass containers maintained at 400° F. and found to cure in a matter of seconds.

Example 5

One part of aluminum chloride was reacted with three parts of BRZ–7541 by heating the mixture to 100 C. with stirring. The yellow product was then diluted with four parts of propylene glycol dibenzoate. A mixture of five parts of this catalyst with fifty parts of the masterbatch described in Example 1 gave a cure time of thirty seconds at 150° C. for a one-half mil film coated on tinplate. The viscosity remained constant over several hours time.

Example 6

A mixture of 282 parts of freshly distilled phenol and 246 parts of aluminum secondary butoxide was heated with stirring to 150–160° C. and maintained at reflux for two hours. After distilling off 222 parts of secondary butanol, the aluminum phenolate was obtained as a dark brown, hard resinous mass. Other aluminum phenolates and cresolates can be prepared in a like manner. A mixture of four parts of this catalyst diluted with four parts of dioctylphthalate was added to the masterbatch described in Example 1. This ink gave a cure time of thirty seconds at 150° C. for a one-half mil film coated on tinplate. The pot life for useful ink performance exceeded two hours.

Example 7

A mixture of fifteen parts distilled m-cresol and eleven and three-tenths parts of aluminum secondary butoxide was heated with stirring to 150–160° C. and maintained at reflux for three hours. After distilling off the secondary butanol formed, a crystalline product was obtained. Four parts of this catalyst gave a cure time of 30 sec. at 150° C. for a one mil film on tinplate when mixed with the masterbatch of Example 1. In a like manner aluminum secondary butoxide was reacted with o-cresol and BRZ–7541 to give catalysts that gave rapid cures with the masterbatch described in Example 1 and were useful for printing and coating.

Example 8

In this Example a polyvalent metal-modified phenol-aldehyde resin was used as a hardener and activator or catalyst for a coating mixture predominating in 3,4-epoxy-cyclohexylmethyl-3,4-epoxycyclohexane carboxylate, diepoxide having the following structure:

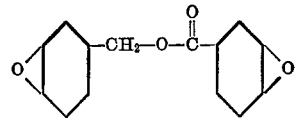

Ten grams of phenol-formaldehyde resin (novolac type, $n=1-3$) were mixed with one gram of ferric chloride dissolved in 20 ml. of methyl alcohol. After solution of the resin in the alcohol, the alcohol was evaporated on a steam bath to leave a brown paste. Then, 10 grams of Epoxide VI were mixed with one gram of this paste. A film produced from this mixture after heating less than one minute at 200° C. (392° F.) provided a transparent brown, tough coating for glass having high resistance to chemicals.

In addition to application to glass, coating mixtures of the present invention have been applied by spraying onto hot aluminum foil and wet sand blasted steel pipes. The coating mixture cured rapidly and formed an adherent coating on these materials.

Another embodiment of the invention is the coloring of glass fibers and of fabrics woven from glass fibers.

In the production of colored glass fibers, the glass is extruded from a dye in the form of fibers which are later woven into a fabric. Glass fibers so produced are fragile and they lose strength and become more brittle very rapidly. To protect such fibers, to inhibit their loss of strength and increase in brittleness and to lubricate them, a protective coating is applied by spraying or dipping immediately after the fiber is extruded. In practice, the fiber is coated as it comes from the die within a few inches of the die orifice. After the coated fibers are woven into fabric, it is necessary to remove the coating, as with a solvent, and then apply a dye.

In accordance with the present invention, the glass fibers are coated, preferably as they come from the die in accordance with previous practice, but with one of the coating agents of the present invention. For example, the coating mixture of Example 1, or any of the other coating mixtures herein described may be employed, and the selected coating mixture is incorporated a suitable dye or pigment. The glass fibers as they are extruded from the dies and while still hot (e.g. at a temperature of 400° to 500° F.) are sprayed with, for example, a mixture of Example 1, or they are passed through a body of such mixture. The coating so applied may be further cured by passing the coated fibers through an oven or tunnel being sufficient to cure the coating. The coating thus applied serves the multiple purposes of protecting the fibers from moisture, cushioning mechanical shocks, lubricating the fibers and providing the desired color. The steps of removing the lubricant coating and subsequent step of applying a dye, as in the conventional process, are avoided. If it is not desired to color the fabric, a clear coating agent of the present invention without an added colorant may be used. Since the coatings are clear, color is not imparted to the fibers, yet the coatings impart lubricity, protect the fibers against degradation and are sufficiently adherent and inconspicuous to be used for this purpose.

The coating compositions of the invention may be applied by electrostatic spraying techniques using equipment such as that manufactured by Ransburg Electrocoating Corporation of Indianapolis, Ind. and Chicago, Ill. Other electrostatic spraying systems may be used. Such systems have in common an applicator to spray a liquid coating material, means for conferring on the particles of sprayed material an electric charge and a grounding means for supporting the article to be coated so as to maintain an opposite electrical charge on the surface to be coated. This technique is recognized as an efficient spraying technique because the electrostatic forces concentrate the sprayed material onto the surface to be sprayed and greatly reduced waste coating material. That is to say in the electrostatic spraying technique there is not as much of the sprayed material as in ordinary spraying techniques and the inconvenience, fouling of the environment, etc., experienced in ordinary spray techiques are greatly mitigated by the electrostatic technique.

A particularly advantageous electrostatic spraying technique and apparatus therefor is that described in a paper by Emory P. Miller and Lester L. Spiller entitled "Electrostatic Coating Process (Part I and Part II)" published in Paint and Varnish Production of June and July 1964. Such apparatus comprises a disc unit described in Part I and depicted in FIGS. 7 and 9 thereof and in the corresponding text, all such being incorporated herein by reference.

In this technique a rotating disc is provided which rotates rapidly enough to eject, by centrifugal force, a spray of liquid introduced at the center of the disc and to spray the ejected material onto the surface to be coated. The coating material is supplied to the center of the rotating disc, for example by forcing it under pressure up through an axial passage formed in the vertical shaft supporting the disc (the disc being horizontal). An electric potential is applied to the disc to give an electric charge (which is concentrated at the edge of the disc); the articles to be coated are carried by a continuous conveyor about the rotating disc through an angle of almost 360°; and the conveyor is provided with means to maintain an electric charge of opposite sign on the articles conveyed and to carry away the charges on the sprayed particles. Each article will also be caused to spin about its own vertical axis so as to expose its entire outer surface to the spray unless it is intended to coat only one surface, such as one side of a panel. Also relative vertical motion of each article and the disc will be produced, most conveniently by reciprocating the disc along its vertical axis so as to coat the entire height of each article. Bottom surfaces are coated by this procedure, for example, the bottoms of bottles and other glass containers. Where desired seals may be applied to the open tops of containers to prevent entry of liquid coating materials into the interior of the containers although generally this is not necessary. The apparatus described will be suitably housed to confine sprayed material that misses the surfaces to be sprayed or that drips from such surfaces.

Heretofore, in employing this technique, it has been though to be necessary to use a polar solvent to impart the necessary electrical characteristics to the coating material. We have found that this is not necessary with materials of the present invention, especially those that contain a metal salt such as any of the polyvalent metal salts of phenolic resins, or polyhydric phenols or polysiloxanols mentioned above, or any of the Lewis acids mentioned above, such as stannous octoate and triphenyltin chloride or conductive pigments and other conductive adjuvants. The coating mixtures of the present invention have the desired electrical characteristics and, where they do not have such characteristics or have them in insufficient degree, such characteristics may be imparted by incorporating a soluble metal salt such as calcium, barium, sodium, aluminium, Fe III, Ti IV, Sn II and zinc salts of phenolic novolac resins such as Resin V, of polyhydric phenols and of the polysiloxanols mentioned above.

GENERAL OBSERVATIONS

From the description and data above it will be apparent that a wide variety of solventless cycloaliphatic polyepoxide systems may be used to coat glass and other solid surfaces and to function as inks. In the case of coatings, the requirements are that the system have a low enough viscosity to permit its application preferably by spraying as a uniform thin film; that the applied liquid film cure quickly at temperatures of about 300° to 500° F.; that the cured coating be hard enough, tough enough and tenacious enough to serve the intended purpose; and that the system contain little if any solvent, diluent or the like which requires evaporation and does not react with the system to avoid the necessity of evaporation. In addition to these requirements there are certain desiderata. Among such desiderata, which are satisfied by the preferred cycloaliphatic polyepoxides of the invention, are the following: Cure to a hard coating at 300° to 500° F. in a very few minutes or less than one minute; production of an adherent coating which is resistant to caustic, hot water, steam and solvents such as 50% ethanol; production of a clear, colorless coating which is, therefore, adapted to preserve transparency where that is desired and which can take on the color of an added dye or pigment; compatibility with a large number of adjuvants such as dyes, pigments, ultraviolet absorbers, etc.; a pot life of hours or days such that a complete system ready for application can be made up in quantity in advance and need not be used immediately; and electrical conductivity such that the system is compatible with the electrostatic spraying technique.

In the case of inks, the desiderata are a relatively high viscosity, achieved through the use of solid hardeners, pigments such as carbon black and fillers such as fumed silica. The inks must cure on press at speeds up to 2000 ft./min. at temperatures not to exceed 350° F.

It will be understood that not all of the desiderata need be satisfied for the system to be useful and to be satisfactory for certain types of service. It will also be understood that where a system does not fully satisfy a requirement or a desideratum it is often possible to modify it to meet or satisfy the objective. Thus, an undesirably high viscosity may be improved by adding a low viscosity reactive diluent such as vinylcyclohexene dioxide; too slow a cure may be remedied by employing a higher temperature or a more active catalyst or by prepolymerizing. Too fast a cure may be remedied by employing a lower temperature and/or a less active catalyst, or by using an electrostatic spraying system and mixing the monomer system and catalyst continuously just before application to the spinning disc. If the monomer is too volatile, volatility may be reduced by prepolymerization, or by using a more active catalyst and a lower temperature. Brittleness of the film on glass may be remedied by using a plasticizer such as vinyl stearate or by use of a catalyst which permits a lower temperature, hence inhibits oxidation. Where difficulties are the result of oxidation, as for example, embrittlement, the application and curing may be carried out in an inert atmosphere, e.g. carbon dioxide or nitrogen.

Among other uses and advantages of the invention are tinting window and windshield glass and the application of a protective coating (clear or colored) to conductive strips applied to glass for de-icing and defogging. Also as stated above, the ceramic products may be coated to preserve strength and, if desired, to color the ceramic.

It will, therefore, be apparent that new and useful techniques and products are provided for coating various articles.

What is claimed is:
1. A curable, solventless coating composition comprising 40 to 80 wt. percent of a cycloaliphatic polyepoxide having at least two epoxide groups, 5 to 30 wt. percent of a phenol-aldehyde resin and 2 to 15 wt. percent of a polyvalent metal salt of a polyhydric phenolic material said coating composition being curable in a period of time ranging from 0.3 seconds to 30.0 seconds upon application to substrate and exposure to a temperature in the range of 200° F. to 400° F.
2. The composition of Claim 1 wherein said phenolic material is a polyhydric phenol resin.
3. The composition of Claim 2 wherein said polyvalent metals are aluminum, Fe III or Ti IV.
4. The composition of Claim 1 wherein said phenolic material is a low molecular weight phenolic novolac resin.
5. The composition of Claim 4 wherein said polyvalent metals are aluminum, Fe III or Ti IV.
6. The composition of Claim 1 wherein said phenol-aldehyde resin is 2,6-dimethylol-4-hydrocarbyl phenol resin.
7. The composition of Claim 1 further including 5 to 25 wt. percent of pigment.
8. The composition of Claim 1 further including 5 to 20 wt. percent of a reactive epoxy diluent.
9. The composition of Claim 1 wherein said reactive diluent is a glycidyl ether.
10. A solventless printing ink composition comprising 40 to 80 wt. percent of a cycloaliphatic polyepoxide having at least two epoxide groups, 5 to 30 wt. percent of a phenol-aldehyde resin, 2 to 15 wt. percent of a polyvalent metal salt of a polyhydric phenolic material said coating composition being curable in a period of time ranging from 0.3 seconds to 30.0 seconds upon application to substrate and exposure to a temperature in the range of 200° F. to 400° F. and 5 to 25 wt. percent of a pigment, said ink being curable in a period of time ranging from 0.3 seconds to 30.0 seconds upon application to a printable surface and exposure to a temperature in the range of 200° to 400° F.
11. The ink composition of Claim 10 wherein said phenolic material is a low molecular weight novolac resin.
12. The ink composition of Claim 11 wherein said polyvalent metal is selected from the group consisting of aluminum, Fe III or Ti IV.
13. The ink composition of Claim 10 wherein said phenol-aldehyde resin is 2,6-dimethylol - 4 - hydrocarbyl phenol resin.
14. The ink composition of Claim 10 further including 5 to 20 percent of a reactive epoxy diluent.
15. The ink composition of Claim 14 wherein said diluent is a glycidyl ether.

References Cited
UNITED STATES PATENTS

| | | | |
|---|---|---|---|
| 3,563,850 | 2/1971 | Stackhouse | 260—831 |
| 2,837,493 | 6/1958 | Schlenker | 260—831 |
| 2,876,208 | 3/1959 | Naps | 260—831 |
| 3,298,999 | 1/1967 | Kirayama | 260—831 |

FOREIGN PATENTS

| | | | |
|---|---|---|---|
| 38–26793 | 12/1961 | Japan | 260—831 |
| 639,929 | 4/1962 | Canada | 260—831 |

PAUL LIEBERMAN, Primary Examiner

U.S. Cl. X.R.

117—123 D, 124 E, 124 F, 132 BE, 132 BS; 260—30.4 Ep, 37 Ep, 824 Ep, 826, 831